April 5, 1949.　　　　　G. W. HOLMES　　　　　2,466,589
SICKLE BAR SAFETY RELEASE
Filed Feb. 16, 1945　　　　　　　　　　　　　2 Sheets-Sheet 1
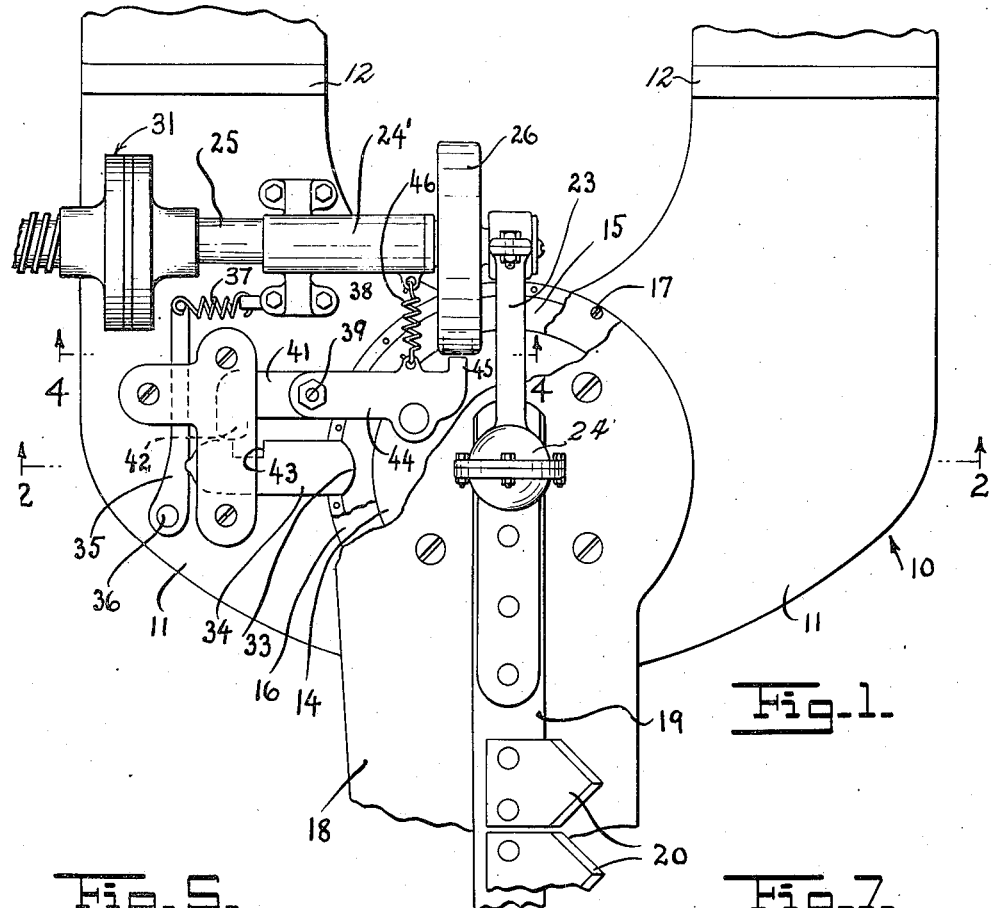
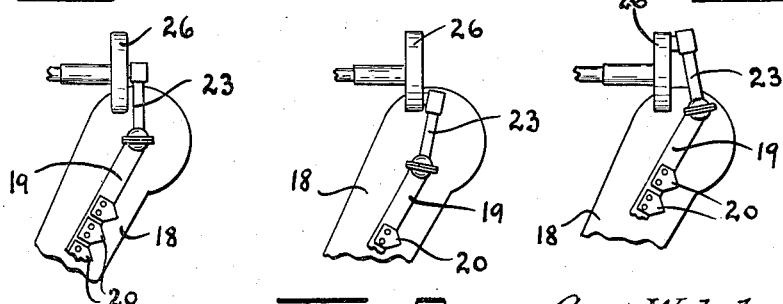
Inventor
*Gray Webster Holmes*
By *Clarence A. O'Brien
and Harvey B. Jacobson*
Attorneys April 5, 1949.  G. W. HOLMES  2,466,589
SICKLE BAR SAFETY RELEASE
Filed Feb. 16, 1945  2 Sheets—Sheet 2
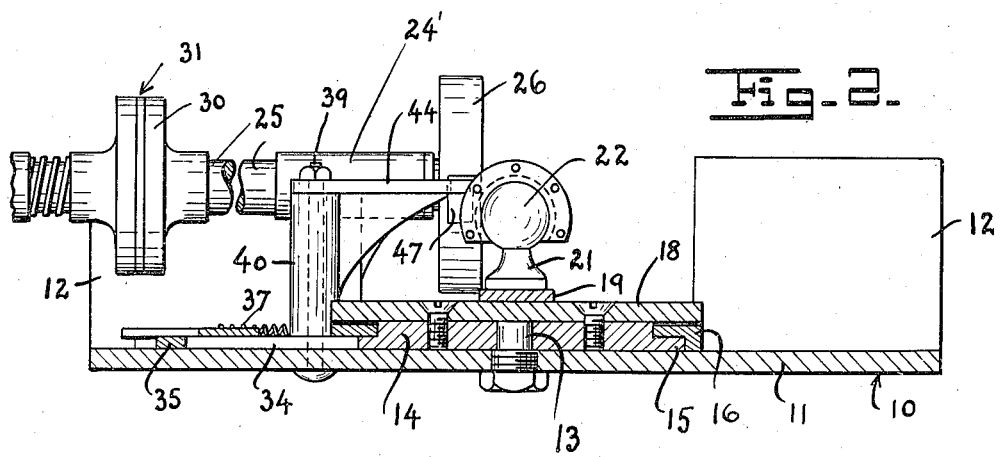
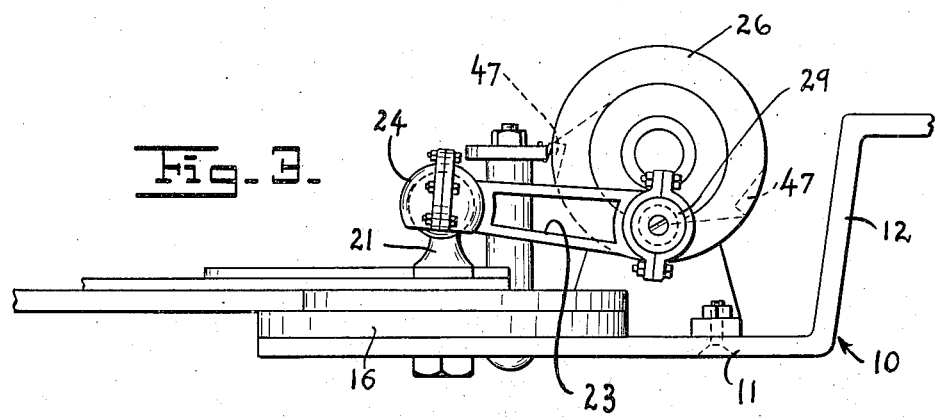
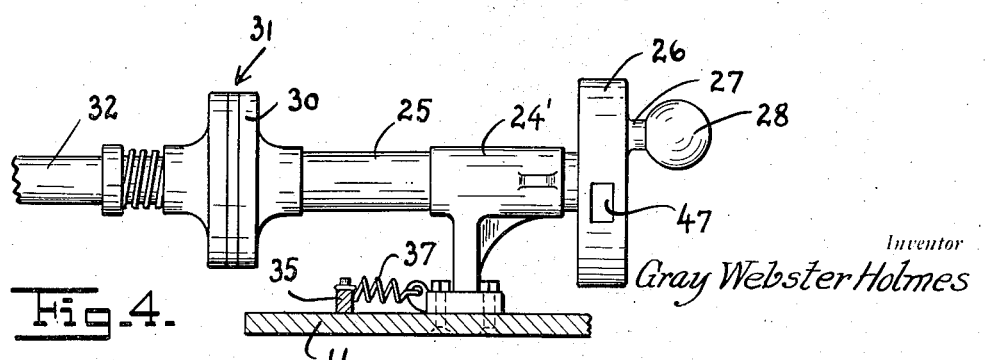
Inventor
Gray Webster Holmes
By Clarence A. O'Brien
and Harvey B. Jacobson
Attorneys Patented Apr. 5, 1949

2,466,589

UNITED STATES PATENT OFFICE 2,466,589

SICKLE BAR SAFETY RELEASE

Gray Webster Holmes, Miller, Mo.

Application February 16, 1945, Serial No. 578,260

4 Claims. (Cl. 56—25)

This invention relates to release mechanism for the sickle bar of a mowing machine such as is commonly used in the harvesting of grain, the cutting of weeds and similar operations.

The primary object of the invention is to prevent injury to the sickle bar and cutting knives when a foreign object such as a stone, stump, or the like is encountered by the sickle bar.

The above and other objects may be accomplished by employing my invention which embodies among its features pivotally mounting the sickle bar of a mowing machine to swing about a vertical axis, releasably locking the sickle bar in such position by a mechanism which when the sickle bar encounters a stone, stump or like foreign obstacles will permit the bar to swing about its axis and at the same time serve to arrest motion of the cutter blades and thereby avoid injury thereto.

Other features embody a novel pitman arrangement which will permit the bar to swing irrespective of the position of the cutter blades thereon.

In carrying my invention into practice I employ mechanism such as that disclosed in the drawings in which:

Figure 1 is a top plan view of a sickle bar and hanger arrangement embodying my invention.

Figure 2 is a transverse sectional view taken on the line 2—2 of Figure 1.

Figure 3 is an end view of Figure 1 viewed from the right.

Figure 4 is a transverse sectional view taken on the line 4—4 of Figure 1 with the pitman link removed.

Figure 5 is a diagrammatic plan view showing the sickle bar moved back out of cutting position with the blades in one position.

Figure 6 is a view similar to Figure 5 showing a different position of the blade, and Figure 7 is a view similar to Figures 5 and 6 showing a still different position of the cutter blades and illustrating the flexibility of the invention.

Referring to the drawings in detail the sickle bar hanger designated generally 10 comprises a plate 11 which is attached to the mowing machine chassis in any suitable manner as by upturned brackets 12. Extending upwardly through the sickle bar hanger 10 midway between the brackets 12 is a stud 13 which serves as a pivot for the sickle bar 18.

Mounted for rotary movement about the pivot 13 on the upper side of the plate 11 is a circular plate 14 formed adjacent its lower edge with a flange 15 for engagement with a grooved ring 16 which is attached to the plate 11 by a peripheral row of screws 17. Secured to the upper side of the disk 14 is a sickle bar 18 carrying on its upper surface the usual reciprocating knife bar 19 to which the cutting knives 20 (Figure 1) are attached. Rising upwardly from a point near the end of the knife carrying bar 19 is a pedestal 21 carrying at its upper end a spherical head 22 to which the pitman link 23 is attached by a spherical socket 24. It will thus be seen that a universal connection is effected between the link 23 and the blade carrying bar 19.

Mounted in a suitable bracket 24' which is attached to the plate 11 as illustrated in Figures 3 and 4, are bearings sustaining a shaft 25 which carries at one end a crank disk 26 extending from one face of which is a crank pin 27 terminating in a spherical head 28 for enclosure within a spherical socket 29 formed on the end of the link 23 opposite the spherical socket 24. It will thus be seen that as the shaft 25 rotates the knife bar 19 will be reciprocated longitudinally of the sickle bar. Carried at the end of the shaft 25 opposite that carrying the crank disk 26 is one element 30 of a friction coupling designated generally 31 the opposite element of which is carried by a main drive shaft 32. The purpose of this coupling will be more fully hereinafter explained.

Formed in the periphery of the flange 15 on the plate or disk 14 is a notch 33. As illustrated in Figure 1, the notch is formed in the edge of the disk. Mounted for sliding movement along an axis perpendicular to that of the sickle bar is a latch bolt 34 which is held into yielding engagement with the bottom wall of the notch by means of a lever 35 which is pivoted as at 36 to the plate 11. The end of the lever 35 opposite that pivoted to the plate 11 is pierced to receive one end of a retractile coil spring 37 the opposite end of which is anchored as at 38 to the bracket 24. It will thus be seen that the lever 35 is yieldingly pressed against the end of the latch bolt 34 to yieldingly hold the latter in the notch 33. Mounted for oscillating motion about an upstanding pivot 39 which is fixed to the plate 11 is a sleeve 40 carrying at its lower end an arm 41 having a dog 42 extending from one side thereof which is adapted to be engaged in a notch 43 formed in one side edge of the latch bolt 34. As shown in Figure 1 the dog 42 is normally held out of engaging position in the notch 43 when the sickle bar is in normal operating position. Formed at the upper end of the sleeve 40 is an arm 44 carrying at its free end a dog 45 which is urged into contact with the periphery of the crank disk 26 under the influence of a retractile spring 46. The crank disk 26 has in its periphery one or more notches or depressions 47 into which the dog 45 is adapted to be entered when the latch bolt 34 is moved into position to allow the dog 42 to enter the notch 43. It will thus be seen that when conditions arise which throws the sickle bar out of alignment the wall of the notch 33 will force the latch bar against the lever 35 and thereby move the notch 43 into registration with the dog 42 thus allowing the spring 46 to function and pull the dog 45 into one of the notches in the crank disk 26. This action will arrest movement of the crank pin as the locking effect will be sufficient to overcome the friction of the friction coupling 31 and hence rotation of the shaft 25 will be arrested. Consequently when the sickle bar encounters a stump, stone or other obstacle reciprocation of the knife bar 19 will be immediately arrested and no injury to the knives carried thereby can result. Due to the universal connections between the crank pin 27 and the link 23 and the link 23 with the stud 21 it is obvious as illustrated in Figures 5, 6 and 7 that motion of the knife bar may be arrested irrespective of the position of the crank pin 27 and the resulting position of the bar 19.

In brief review the operation is as follows. The drive is normally established through drive shaft 32 and coupling 31 to the driven shaft 25 which, in turn, rotates crank disk 26 and thereby through the link 23 causes the knife bar 19 to reciprocate longitudinally of the sickle bar 18. When an obstacle such as a stone or stump is encountered by the sickle bar it will swing about the pivot 13 provided the pressure is sufficient to overcome the tendency of the latch bolt 34 to remain seated in the notch 33. If the pressure is sufficient to so move the latch bolt it is forced backwardly against the lever 35 thus exerting pull on the spring 37 and moving the notch 43 into a position to receive the dog 42. Under the influence of spring 46 the lever 44 on the end of sleeve 40 will advance arm 41 toward the latch bolt 34 and cause the dog 42 to enter the notch 43 in the latch bolt. As a result the next recess 47 in the crank disk 26 will receive the dog 45 and as a consequence rotation of the shaft 25 and the crank disk 26 will be arrested thus arresting further movement of the knife bar 19 and injury to the knife blades will thereby be avoided.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a mowing machine a sickle bar mounted to move about a vertical axis, a knife bar mounted on the sickle bar to reciprocate longitudinally thereof, a drive shaft mounted adjacent the axis about which the sickle bar moves, a crank disk mounted on the drive shaft to rotate therewith, a connecting rod coupled to the knife bar and to the crank disk for reciprocating the knife bar as the crank disk rotates, a source of rotary energy carried by the mowing machine, a friction coupling carried by the drive shaft and coupled to the source of rotary energy for driving said drive shaft and means mounted adjacent the crank disk and operable upon movement of the sickle bar about the vertical axis to engage the periphery of the crank disk and arrest movement thereof when the sickle bar moves about said vertical axis.

2. In a mowing machine a sickle bar mounted to move about a vertical axis, a knife bar mounted on the sickle bar to reciprocate longitudinally thereof, a drive shaft mounted adjacent the axis about which the sickle bar moves, a crank disk mounted on the drive shaft to rotate therewith, a connecting rod coupled to the knife bar and to the crank disk for reciprocating the knife bar as the crank disk rotates, a source of rotary energy carried by the mowing machine, a friction coupling carried by the drive shaft and coupled to the source of rotary energy for driving said drive shaft, said crank disk having a recess in its periphery and means mounted adjacent the crank disk and operatively connected to the sickle bar to enter the recess in the crank disk and arrest rotation thereof when the sickle bar moves about the vertical axis.

3. In a mowing machine a sickle bar mounted to move about a vertical axis, a knife bar mounted on the sickle bar to reciprocate longitudinally thereof, a drive shaft mounted adjacent the axis about which the sickle bar moves, a crank disk mounted on the drive shaft to rotate therewith, a connecting rod coupled to the knife bar and to the crank disk for reciprocating the knife bar as the crank disk rotates, a source of rotary energy carried by the mowing machine, a friction coupling carried by the drive shaft and coupled to the course of rotary energy for driving said drive shaft, said crank disk having a recess in its periphery, a latch dog pivotally mounted adjacent the crank disk, means yieldingly to urge the latch dog to enter the recess in the periphery of the crank disk and arrest movement thereof and a bolt mounted adjacent the latch dog and operable to hold it out of engagement with the crank disk against the effort of the yielding means and means on the sickle bar engageable with the bolt to move said bolt and release the latch dog.

4. In a mowing machine a sickle bar mounted to move about a vertical axis, a knife bar mounted on the sickle bar to reciprocate longitudinally thereof, a drive shaft mounted adjacent the axis about which the sickle bar moves, a crank disk mounted on the drive shaft to rotate therewith, a connecting rod coupled to the knife bar and to the crank disk for reciprocating the knife bar as the crank disk rotates, a source of rotary energy carried by the mowing machine, a friction coupling carried by the drive shaft and coupled to the source of rotary energy for driving said drive shaft, said crank disk having a recess in its periphery, a latch dog pivotally mounted adjacent the crank disk, means yieldingly to urge the latch dog to enter the recess in the periphery of the crank disk and arrest movement thereof, a bolt mounted adjacent the latch dog and operable to hold it out of engagement with the crank disk against the effort of the yielding means, means on the sickle bar engageable with the bolt to move said bolt and release the latch dog, and means mounted adjacent the latch bolt yieldingly to engage it and resist its movement by the means on the sickle bar.

GRAY WEBSTER HOLMES.

REFERENCES CITED

The following references are of record in the file of this patent:

UNITED STATES PATENTS

| Number | Name | Date |
|---|---|---|
| 1,947,552 | Huddle | Feb. 20, 1934 |
| 2,195,831 | Thompson et al. | Apr. 2, 1940 |
| 2,269,980 | MacDonald | Jan. 13, 1942 |
| 2,328,617 | Colvin | Sept. 7, 1943 |